US005088039A

United States Patent [19]

Kugimiya et al.

[11] Patent Number: 5,088,039

[45] Date of Patent: Feb. 11, 1992

[54] SYSTEM FOR TRANSLATING ADVERB PHRASES PLACED BETWEEN TWO COMMAS THROUGH A CONVERTER USING TREE-STRUCTURED CONVERSION RULES

[75] Inventors: Shuzo Kugimiya, Nara; Yoji Fukumochi, Ikoma; Ichiko Sata, Nara; Tokuyuki Hirai, Yamato-Koriyama; Hitoshi Suzuki, Nara, all of Japan

[73] Assignee: Sharp Kabushiki Kaisha, Osaka, Japan

[21] Appl. No.: 513,283

[22] Filed: Apr. 20, 1990

[30] Foreign Application Priority Data

Apr. 24, 1989 [JP] Japan ................................ 1-104238

[51] Int. Cl.[5] .............................................. G06F 15/38

[52] U.S. Cl. ................................ 364/419; 364/920.4; 364/DIG. 2

[58] Field of Search ................ 364/419, 200 MS File, 364/900 MS File

[56] References Cited

U.S. PATENT DOCUMENTS

| | | | |
|---|---|---|---|
| 4,706,212 | 11/1987 | Toma | 364/900 |
| 4,814,988 | 3/1989 | Shiotani et al. | 364/419 |
| 4,821,230 | 4/1989 | Kumano et al . | 364/900 |
| 4,887,212 | 12/1989 | Zamora et al. | 364/900 |
| 4,931,936 | 6/1990 | Kigimiya et al. | 364/200 |
| 4,953,088 | 8/1990 | Suzuki et al. | 364/419 |
| 4,962,452 | 10/1990 | Nogami et al. | 364/419 |
| 5,005,127 | 4/1981 | Kigimiya et al. | 364/419 |

FOREIGN PATENT DOCUMENTS 62-262177 11/1987 Japan .

*Primary Examiner*—Thomas C. Lee
*Assistant Examiner*—Mehmet Geckil
*Attorney, Agent, or Firm*—David G. Conlin; Robert F. O'Connell

[57] ABSTRACT

A method of translating a sentence including an adverb phrase put between two commas by using a translating apparatus which includes a dictionary look up and morpheme analyzer for looking up each word constituting an input sentence of a source language in a dictionary and providing a morpheme array of the input sentence from information obtained by looking up the dictionary, syntax analyzer for analyzing a syntactic structure of the morpheme array provided by the dictionary look up and morpheme analyzer with dictionary and grammatical rules, a converter for converting the syntactic structure analyzed by the syntax analyzer into a corresponding syntactic structure of a target language, and a generator for generating a translation in accordance with the syntactic structure of the target language received from the converter referring to the information obtained by looking up the dictionary, in which the adverb phrase is translated firstly, and then the input sentence is translated after the adverb phrase is removed from the input sentence. Finally these two translations are put together.

5 Claims, 5 Drawing Sheets

SOURCE LANGUAGE
L1 DICTIONARY LOOK UP
L2 MORPHEME ANALYSIS
L3 SYNTAX ANALYSIS
L4 MEANING ANALYSIS
L5 CONTEXT ANALYSIS
L6 INTERIM LANGUAGE
L7 CONTEXT GENERATION
L8 MEANING GENERATION
L9 SYNTAX GENERATION
L10 MORPHEME GENERATION
TARGET LANGUAGE

Fig. 5

| t | h | i | s | | | | |
|---|---|---|---|---|---|---|---|
| i | s | | | | | | |
| a | | | | | | | |
| p | e | n | | | | | |
| . | | | | | | | |

Fig. 6

| | | | |
|---|---|---|---|
| this-- | PRONOUN | DEMONSTRATIVE ADJECTIVE | |
| is-- | VERB | | |
| a-- | ARTICLE | | |
| pen-- | NOUN | | |

Fig. 7
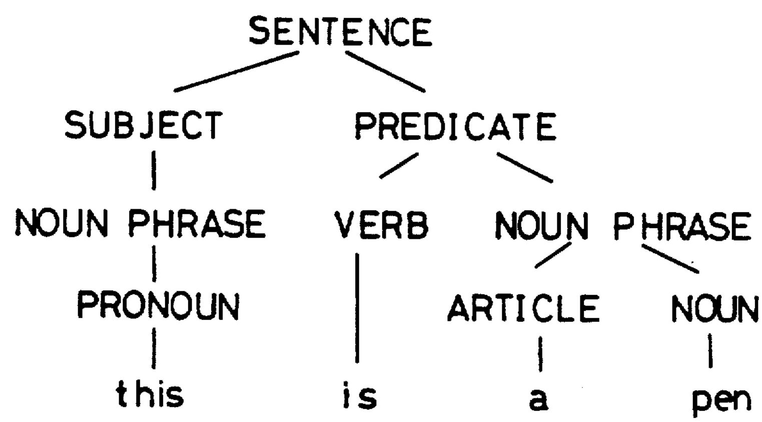
Fig. 8
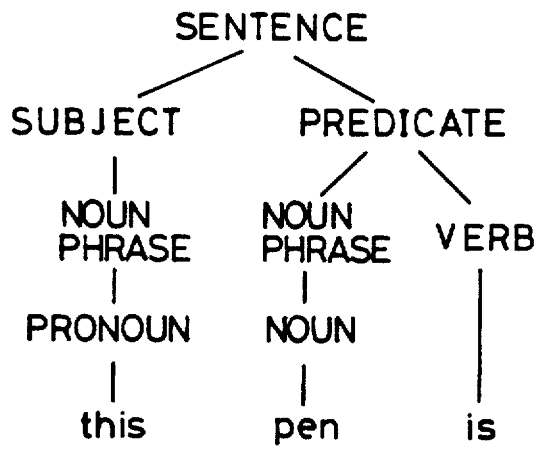
Fig. 9
これはペンである。

SYSTEM FOR TRANSLATING ADVERB PHRASES PLACED BETWEEN TWO COMMAS THROUGH A CONVERTER USING TREE-STRUCTURED CONVERSION RULES

BACKGROUND OF THE INVENTION

1. Field of the Invention

The present invention relates to a method of translating by using a translating apparatus a sentence which includes an adverb phrase put between two commas inserted in an arbitrary position in the sentence.

2. Description of the Related Art

Translating a sentence including an adverb phrase put between two commas by an automatic translating machine involves the danger of failing in syntactic analysis and producing a mistranslation since the adverb phrase may be inserted in an arbitrary position within the sentence.

Therefore, generally, an input sentence including an adverb phrase is translated by a translating machine after the adverb phrase is deleted from the input sentence, and then a translation of the adverb phrase obtained by manual translation work is added to the translation obtained earlier by the translating machine.

Accordingly, in translating a sentence by a translating machine, there is a problem that translation speed is reduced if the sentence includes an adverb phrase.

SUMMARY OF THE INVENTION

It is therefore an object of the present invention to provide a method of correctly translating a sentence including an adverb phrase put between two commas inserted in an arbitrary position by means of a translating apparatus.

The object of the present invention can be achieved by a method of translating a sentence by using a translating apparatus which includes dictionary look up and morpheme analyzing means for looking up each word constituting an input sentence of a source language in a dictionary and providing a morpheme array of the input sentence from information obtained by looking up the dictionary, syntax analyzing means for analyzing a syntactic structure of the morpheme array provided by said dictionary look up and morpheme analyzing means with dictionary and grammatical rules, converting means for converting the syntactic structure analyzed by said syntax analyzing means into a corresponding syntactic structure of a target language, and generating means for generating a translation in accordance with said syntactic structure of the target language received from said converting means referring to the information obtained by looking up the dictionary, said method comprising the steps of:

if it is determined that an adverb phrase put between two commas is present in an input sentence on the basis of the result of looking up the dictionary by said dictionary look up and morpheme analyzing means, storing the number of words between said two commas in a memory as inserted-adverb-phrase information being related to a word just before the former one of said two commas;

if it is determined that the word related to said inserted-adverb-phrase information exists by referring to said memory, performing syntactic analysis by said syntax analyzing means after removing the number words indicated by said inserted-adverb-phrase information following said word related to the said information;

if it is determined that the word related to said inserted-adverb-phrase information exists by referring to said memory, generating a first translation of the number of words indicated by said inserted-adverb-phrase information following said word related to the said information;

attaching a punctuation mark after said first translation;

generating a second translation in accordance with the result of the syntax analysis performed by said syntax analyzing means; and putting said second translation after said first translation.

In accordance with the above method, even if an adverb phrase put between two commas is inserted in an arbitrary position within an input sentence, it is possible to generate a correct translation by means of the translation apparatus without requiring manual correcting processes, thereby increasing the speed of translation.

Further objects, features and advantages of the present invention will become apparent from the following detailed description of an embodiment of the present invention with reference to the accompanying drawings.

BRIEF DESCRIPTION OF THE DRAWINGS

FIGS. 5 through 9 are views showing the contents of buffers of the translation module;

DESCRIPTION OF THE PREFERRED EMBODIMENT

Figure 1:
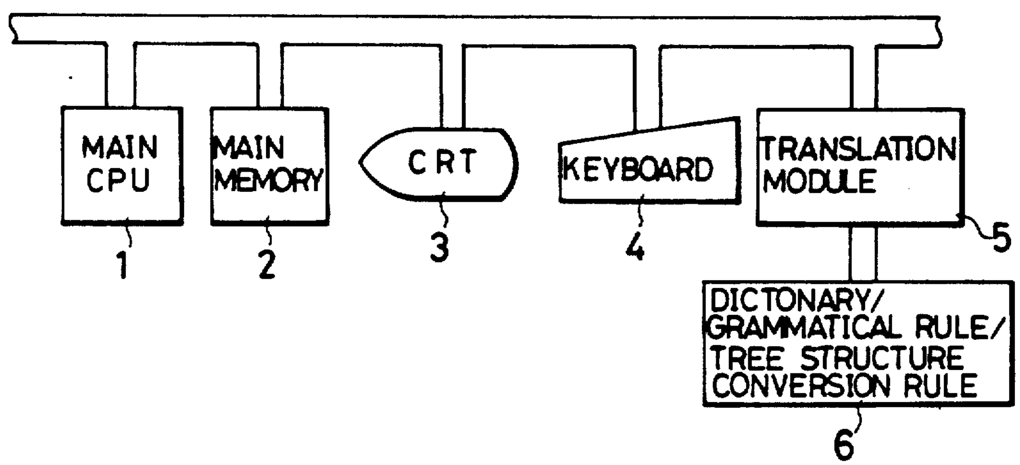
FIG. 1 is a block diagram of a translating apparatus used to perform the method of the present invention.

FIG. 1 is a block diagram of a translating apparatus used to perform the method of the present invention. The translating apparatus comprises a main central processing unit (main CPU) 1, a main memory 2, a cathode-ray tube (CRT) 3, a key board 4, a translation module 5, and a memory 6 which stores a dictionary for translation, grammatical rules, and tree-structure conversion rules.

The translation module 5 is arranged to receive a source language, translate it into a corresponding target language, and output this target language. The source language which is inputted through the key board 4 is transferred to the translation module 5 under the control of the main CPU 1. The translation module 5 translates the inputted source language into the corresponding target language by using the dictionary, grammatical rules, tree-structure conversion rules stored in the memory 6. The result is temporarily stored in the main memory 2 and is displayed on the CRT 3.

Figure 2:
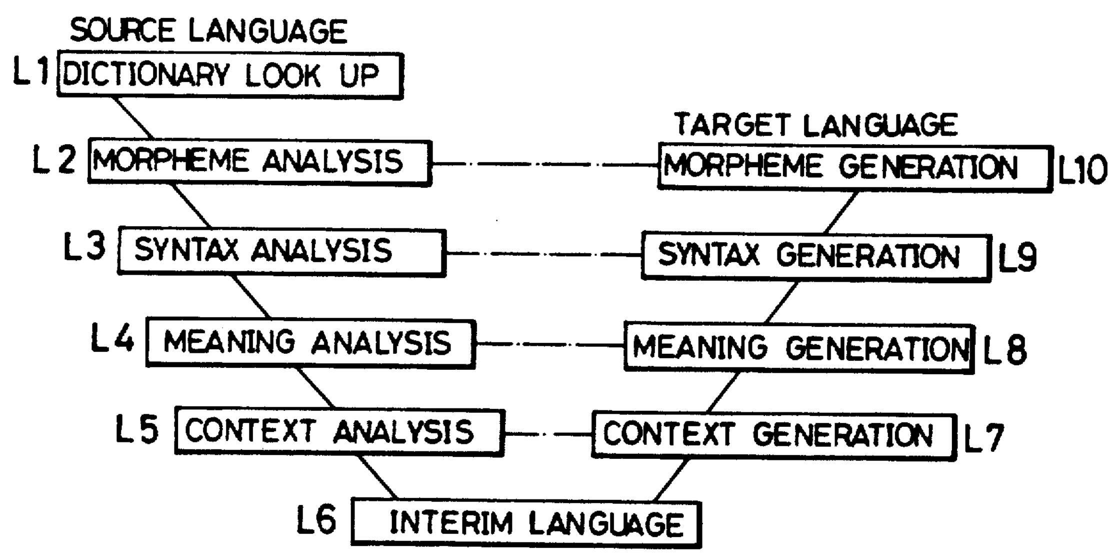
FIG. 2 is an explanatory view of translation levels in the apparatus of FIG. 1.

The machine-made translations processed by the translation module 5 generally comprises such analyzing levels as shown in FIG. 2. When a source language is inputted at the top-left part of FIG. 2, the analysis proceeds to level L1 (dictionary look up), level L2 (morpheme analysis), level L3 (syntax analysis) and so on.

Machine-made translation methods are roughly classified into two categories depending on the analyzing levels.

One is called a pivot method in which a source language is analyzed up to level 6 to generate a concept (called the "interim language") which does not depend on the source language or target language, and thereafter, analyses of level L7 (context generation), level L8 (meaning generation), level L9 (syntax generation) and level L10 (morpheme generation) are executed thereby generating the target language.

The other method is called a transfer method which executes analysis up to any one of level L2 (morpheme analysis), level L3 (syntax analysis), level L4 (meaning analysis) and level L5 (context analysis) to obtain the internal structure of the source language sentence, and then converts the internal structure into an internal structure of the target language having the same level, thereby generating the target language.

Each of the above analyses will be explained below in more detail.

Dictionary Look up and Morpheme Analysis

An input sentence is divided into individual morphemes to form a morpheme array (word array) by referring to the dictionary stored in the memory 6. Then, grammatical information, such as a parts of speech and corresponding equivalents are obtained for each word. Further, tense, person, number and the like are analyzed.

Syntax Analysis

The structure of the sentence such as a relation among the words (or tree-structure) is determined a explained later.

Meaning Analysis

It is determined which is semantically correct or incorrect from plural results of the syntax analysis.

Context Analysis

Abbreviation or ambiguity is removed with understanding of the subject of the sentence.

Figure 3:
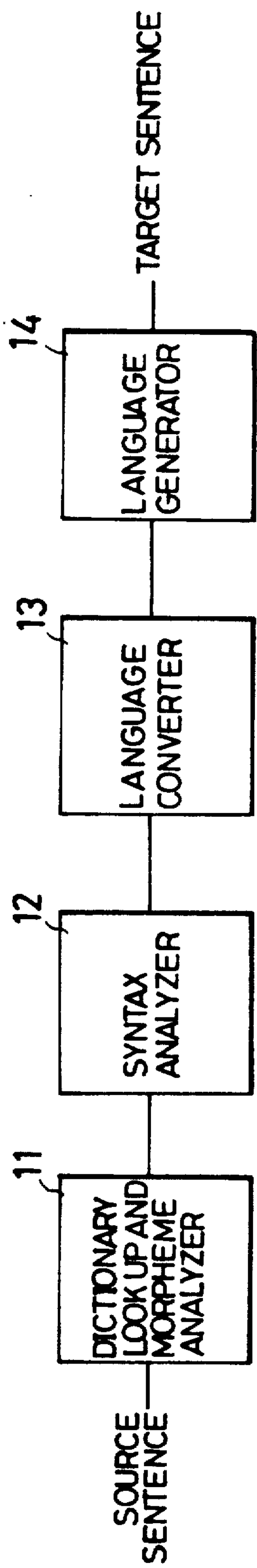
FIG. 3 is a block diagram of a translation module used in the apparatus of FIG. 1.

The translation module 5 used in the present embodiment performs analysis at least up to level L3, that is up to syntax analysis. Accordingly, the translation module of this embodiment comprises dictionary look up and morpheme analyzer 11, syntax analyzer 12, language converter 13, and language generator 14 as shown in FIG. 3.

Figure 4:
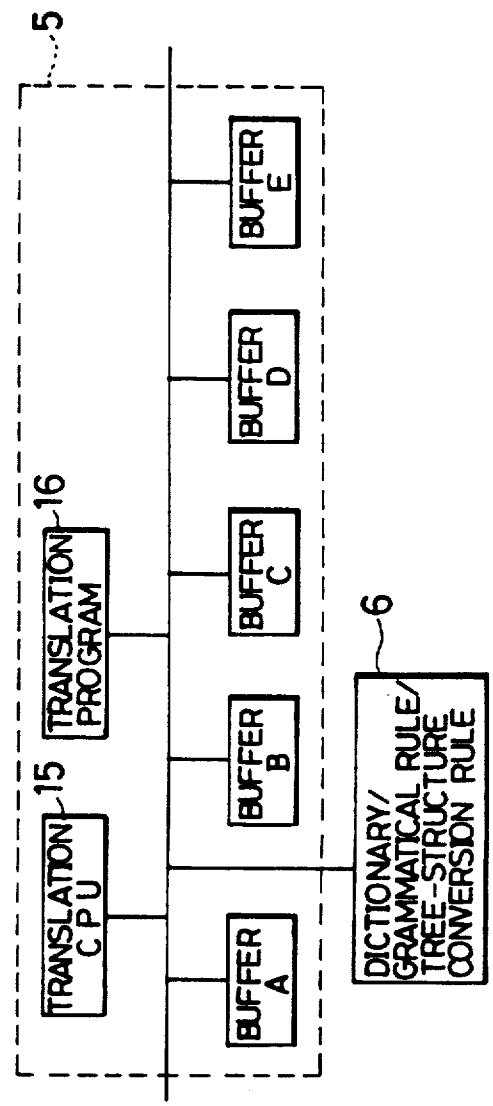
FIG. 4 is a view showing an internal construction of the translation module.

FIG. 4 is a view showing the internal construction of this translation module 5. FIGS. 5 through 9 show the contents of the respective buffers A through E of FIG. 4 which have been utilized to translate an English sentence "This is a pen." into a corresponding Japanese sentence.

At first, the original English sentence is read in the buffer A as shown in FIG. 5. Sequentially, dictionary look up and morpheme analyzer 11 is actuated, and hence, required information on each word of the original sentence stored in the buffer A is identified by using the dictionary stored in the memory 6 under the control of a translation CPU 15 which operates based on a translation program 16, and the identified information is stored in the buffer B as shown in FIG. 6. Although the word "this" is used as several different parts of speech, one of the parts of speech is selected by the syntax analyzer 12. A tree-structure representing relations among the individual words is determined as shown in FIG. 7 in accordance with the dictionary and grammatical rules stored in the memory 6, and the tree-structure is stored in the buffer C. The tree-structure can be determined from the following grammatical rules stored in the memory 6.

sentence→subject and predicate
subject→noun phrase
predicate→verb and noun phrase
noun phrase→pronoun
noun phrase→article and noun The above rules mean, by taking the first rule as a example, "A sentence consists of a subject and a predicate.", which is the same in other rules.

The language converter 13 converts the tree-structure of the inputted English sentence into a tree-structure of a corresponding Japanese sentence as shown in FIG. 8 by using the tree-structure conversion rules stored in the memory 6. The converted tree-structure is stored in the buffer D. The language generator 14 attaches appropriate articles or auxiliary verbs to a Japanese word array obtained from the converted tree-structure thereby forming the Japanese sentence as shown in FIG. 9. The formed Japanese sentence is stored in the buffer E. This Japanese sentence is outputted from the translation module 5 and stored in the main memory 2, and concurrently displayed on the CRT 3.

Figure 10:
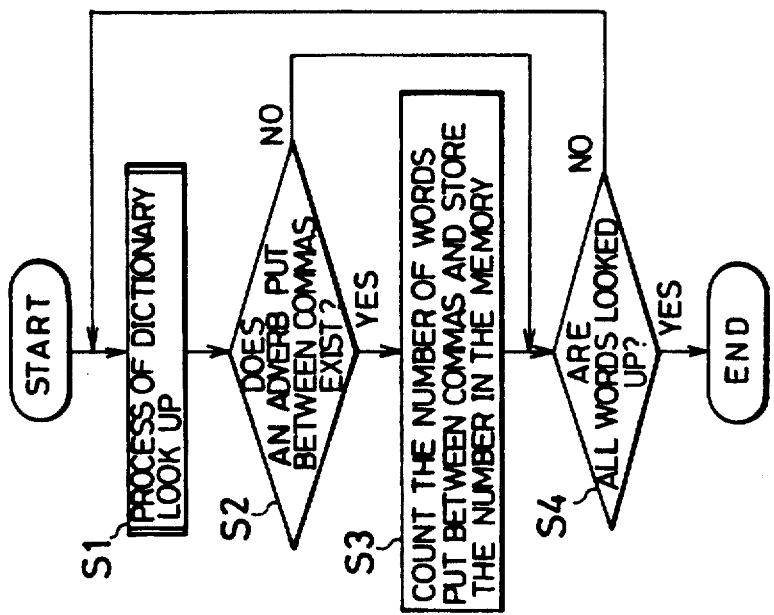
FIG. 10 is a flow chart for explaining the dictionary look up process of the apparatus.

The dictionary look up process performed by the dictionary look up and morpheme analyzer 11 of the method according to the present invention will now be described below with reference to the flow chart of FIG. 10.

In Step $S_1$, individual words included in an inputted source sentence are looked up by the dictionary stored in the memory 6 in order, and information obtained by the dictionary look up is stored in the buffer B. In Step $S_2$, from the results of the dictionary look up it is determined whether the sentence includes an adverb phrase put between two commas. If such a phrase is detected, the process proceeds to Step $S_3$; otherwise, it proceeds to Step $S_4$.

In Step $S_3$, the number of words between two commas is counted and stored in the buffer B as inserted-adverb-phrase information being related to a word just before the front comma. In Step $S_4$, it is determined whether all words of the source sentence have been looked up by the dictionary. If the dictionary look up has not yet been completed, the process returns to Step $S_1$.

As described above, if the source sentence includes an adverb phrase, the number of words within the adverb phrase is stored in the buffer B as the inserted-adverb-phrase information being related to the word just before the adverb phrase.

When a word affixed with, i.e., related to, the inserted-adverb-phrase information exists in a morpheme array obtained by the dictionary look up and morpheme analysis, the number of words indicated by the inserted-adverb-phrase information just after the word affixed with the information are removed prior to the syntax analysis of the morpheme array by the syntax analyzer 12.

Figure 11:
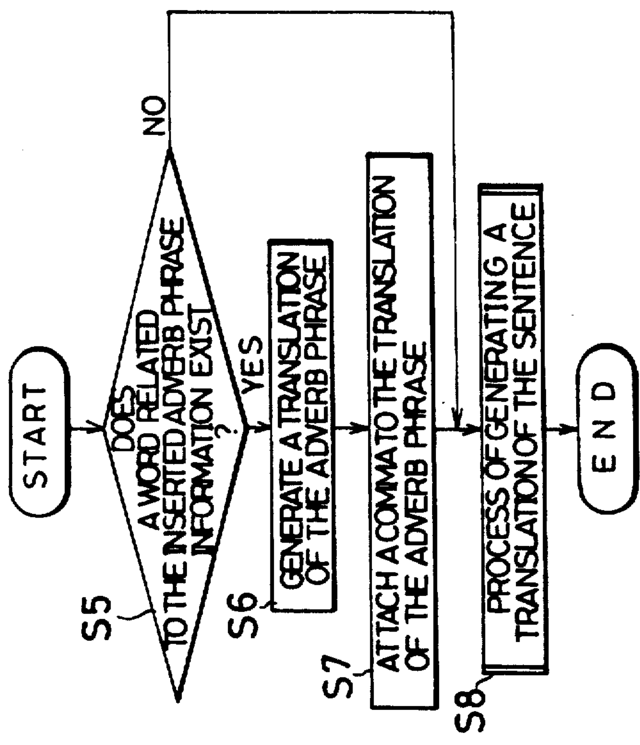
FIG. 11 is a flow chart for explaining the language generating process of the apparatus.

The target sentence generating process performed by the language generator 14 will be explained below with reference to the flow chart of FIG. 11.

In Step $S_5$, with reference to the contents of the buffer B, it is determined whether the source sentence includes a word affixed with the inserted-adverb-phrase information. If such a word is detected, the process proceeds to Step $S_6$; otherwise, it proceeds to Step $S_8$. In Step $S_6$, the number of words indicated by the inserted-adverb-phrase information just after the detected word are translated on the basis of the dictionary look up information stored in the buffer B. In Step $S_7$, a punctuation mark is attached after this translation.

In Step $S_8$, a translation is generated in accordance with the syntactic structure received from the language converter 13 with reference to the dictionary look up information stored in the buffer B.

As described above, if an adverb phrase is present in a source sentence, this phrase is translated firstly, and a punctuation mark is attached to the end of the translation of the adverb phrase, and then a translation of the remaining words is put after the translation of the adverb phrase.

Figure 12:
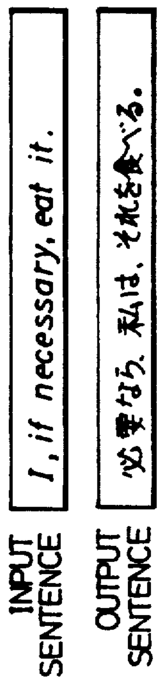
FIG. 12 is a view showing an English sentence inputted to the translation apparatus to which the present invention is applied, and a corresponding output sentence translated in Japanese.

FIG. 12 shows an English sentence "I, if necessary, eat it" to be translated including an adverb phrase and a Japanese translation thereof which is outputted from the translating apparatus for performing the method according to the present invention.

When this English sentence is looked up by the dictionary look up and morpheme analyzer 11 from the head of the sentence in order, since the phrase "if necessary" is an adverb phrase put between two commas, the number of words between the two commas, that is, "two", is related to the word "I" followed by the front comma as the inserted-adverb-phrase information.

In the syntax analyzer 12, if it is determined that the inserted-adverb-phrase information "2" is related to the word "I", the two words just after the word "I", that is the words, if and "necessary are removed, and the sentence I eat it" is subjected to the syntax analysis.

In the language generator 14, if it is determined that the inserted-adverb-phrase information "2" is related to the word "I", the phrase which consists of the two words "if" and "necessary" following the word "I" is translated and the punctuation mark is attached to the end of this translation. Subsequently, "I eat it" is translated in accordance with the syntactic structure received from the language converter 13, and this translation is put after the translation of the phrase "if necessary", thereby completing translation process.

Many widely different embodiments of the present invention may be constructed without departing from the spirit and scope of the present invention. It should be understood that the present invention is not limited to the specific embodiment described in this specification, except as defined in the appended claims.

What is claimed is:

1. A machine translation system for translating a sentence of a source language into a sentence of a target language comprising:

input means for storing an input sentence of said source language to be translated, said input sentence including an adverb phrase put between two commas;

means for storing the number of words of said adverb phrase and inserted-adverb phrase information;

means for deleting from said input sentence succeeding a word just before said adverb phrase as many words as indicated by said inserted-adverb-phrase information in order to define said whole of said input sentence excepting said adverb phrase;

first analysing means for analysing said input sentence morphologically by means of a dictionary;

second analysing means for analysing said input sentence syntactically by means of said dictionary and grammatical rules on the basis of result of analysis by said first analysing means;

converting means for converting said input sentence into an equivalent output sentence of said target language by means of tree-structure conversion rules on the basis of result of analysis by said first and second analysing means; and output means for outputting said equivalent output sentence;

wherein said second analysis means analyses said adverb phrase and the whole of said input sentence excepting said adverb phrase separately, said converting means converts said adverb phrase and said whole of said input sentence excepting said adverb phrase into an equivalent adverb phrase and an equivalent sentence of said target language, respectively, and said output means attaches a punctuation mark after said equivalent adverb phrase and puts said equivalent sentence after said punctuation mark in order to compose an output sentence equivalent to said input sentence.

2. A system according to claim 1, wherein said source language is English, and said target language is Japanese.

3. A system according to claim 1, comprising a memory which stores said dictionary, grammatical rules and tree structure-conversion rules.

4. A system according to claim 1, wherein said first analysing means analyses at least a part of speech, a tense, a person and a number for each word.

5. A system according to claim 1, comprising a cathode ray tube for displaying said output sentence in said target language.

* * * * *